March 26, 1968     F. E. KNOEDLER     3,374,818
VEGETABLE PEELER
Filed March 10, 1966     2 Sheets-Sheet 1
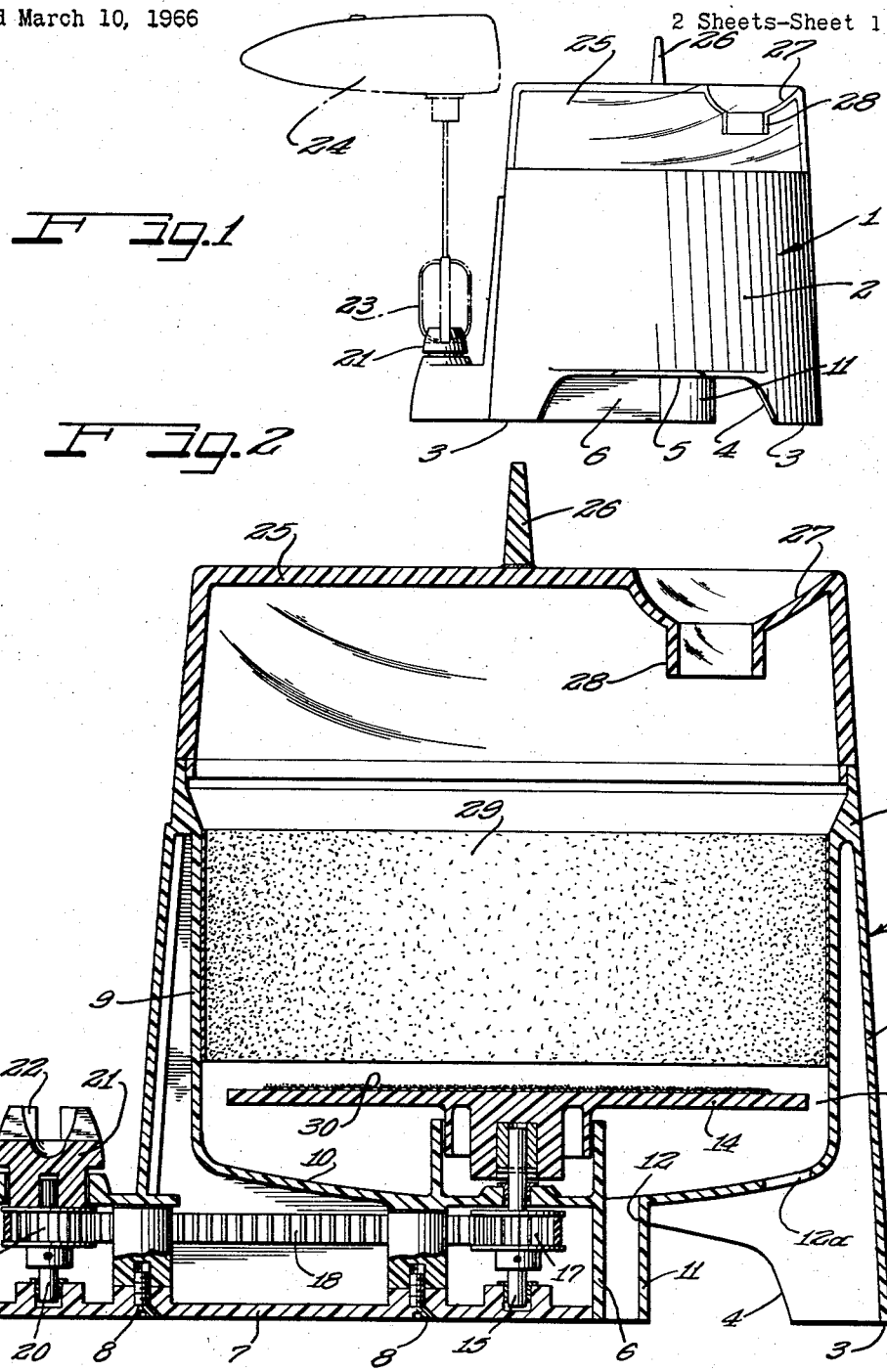
INVENTOR.
Fred E. Knoedler March 26, 1968 — F. E. KNOEDLER — 3,374,818
VEGETABLE PEELER
Filed March 10, 1966 — 2 Sheets-Sheet 2

INVENTOR.
Fred E. Knoedler

BY _____ ATTORNEYS

# United States Patent Office 3,374,818
Patented Mar. 26, 1968

3,374,818
VEGETABLE PEELER
Fred E. Knoedler, P.O. Box 397, Streator, Ill. 61364
Filed Mar. 10, 1966, Ser. No. 533,523
10 Claims. (Cl. 146—49)

This invention relates to improvements in a vegetable peeler, and more particularly to a peeling appliance that may be made sufficiently portable for use in a household, or in a larger size for commercial usage, and which is highly desirable for the peeling of potatoes, onions, beets, turnips, and various other vegetables, although the invention may have other uses and purposes as will be apparent to one skilled in the art.

In the past, many and various types of vegetable peeling devices have been developed. Usually, such machines embody a container for the vegetables, and a false bottom for that container in the form of a rotary disc or turntable. Abrasive material may be applied to the inside wall of the container and also upon the upper surface of the turntable. However, devices of this type heretofore made have in many instances proven objectionable by virtue of the fact that a vegetable was not left smooth and evenly and cleanly peeled. For example, in some instances devices of this type heretofore known had a drive shaft extending centrally through the vegetable container and this frequently resulted in vegetables jamming and wedging between the shaft and inside container wall, in some instances to a sufficient extent to stop the drive motor. In other instances, formerly known devices embodied indentations and projections or other malformations in the wall of the vegetable container, or undulations in the turntable, and such structures caused bouncing, jiggling, shuffling, and knocking about of the vegetables causing chunks to be knocked out of the vegetables, bruising of the same, and excess peeling or reduction in size of parts of the vegetables. In still other instances, devices of this type heretofore known utilized abrasive on the turntable so near the abrasive on the wall that vegetables would be slid around and ground away to a considerable extent on one side only.

With the foregoing in mind, it is an important object of this invention to provide a vegetable peeler that is simple in construction, economical, and in which the vegetables are gently and smoothly rolled around inside the container, not injured or misshaped, and evenly and cleanly peeled.

Another object of this invention is the provision of a vegetable peeling device in which the inside wall of the vegetable container is of uniform diameter without indentations, ridges or other deviations, throughout the region occupied by the vegetables during peeling.

A further object of this invention is the provision of a vegetable peeling device wherein a definite space is provided between the abrasive on the turntable and the abrasive on the inside wall of the vegetable container sufficient to insure a smooth and even rolling of the vegetables during the peeling operation.

While some of the more salient features, characteristics and advantages of the instant invention have been above pointed out, others will become apparent from the following disclosures, taken in conjunction with the accompanying drawings, in which:

FIGURE 1 is a side elevational view of a vegetable peeling device embodying principles of the instant invention, with a household mixing machine positioned to drive the same;

FIGURE 2 is an enlarged central vertical sectional view of the structure of FIGURE 1, with the mixing machine removed;

Figure 3:
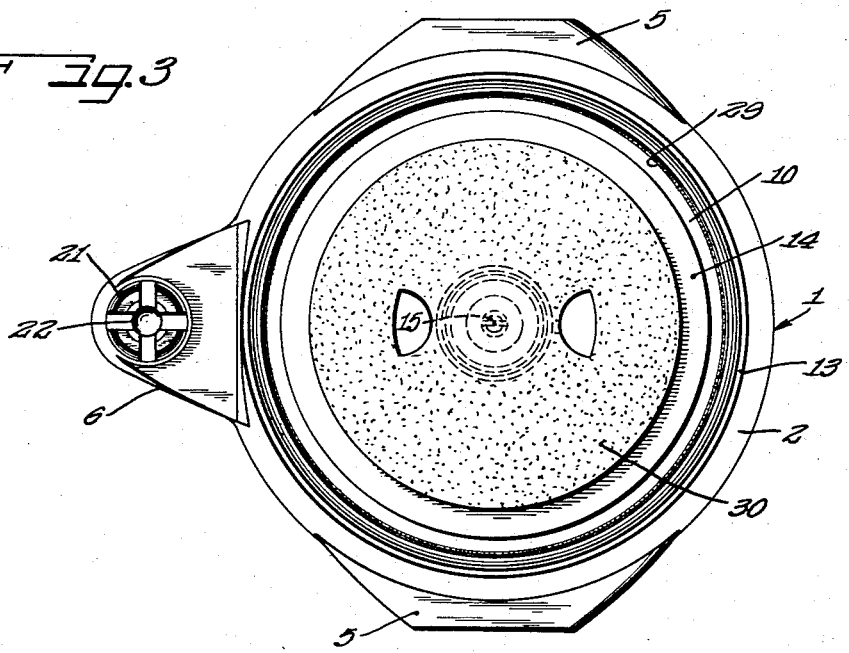
FIGURE 3 is a top plan view of the peeling device itself with the cover removed.

The illustrated embodiment of the instant invention is shown in the form of a household vegetable peeler for use in the home, and which may be driven by the ordinary household mixing machine. It will be understood, however, that the peeler may be made in a larger size for commercial useage, and driven by a commonly known type of electric motor mounted on, under, or adjacent the peeling device.

The illustrated embodiment includes a container structure generally indicated by numeral 1 which may be in the form of a single piece casting or may be fabricated as desired, and which is made of any suitable material such as plastic, cast aluminum, stainless steel, or other satisfactory material enameled or not as may be preferred. The container structure 1 includes an outer shell 2 shaped to provide base portions as indicated at 3 upon which the entire peeler may rest. Between these base portions 3 are cutout portions as indicated at 4, at the tops of which are diametrally opposed handles 5—5 extending laterally by means of which the peeler may easily be picked up and moved from place to place.

Approximately centrally of the container structure and merging with the base part thereof is an integral housing 6 for drive mechanism the underside of which is closed flush with the base arrangement 3 by a base plate 7 held in place by screws 8 or in an equivalent manner.

Figure 4:
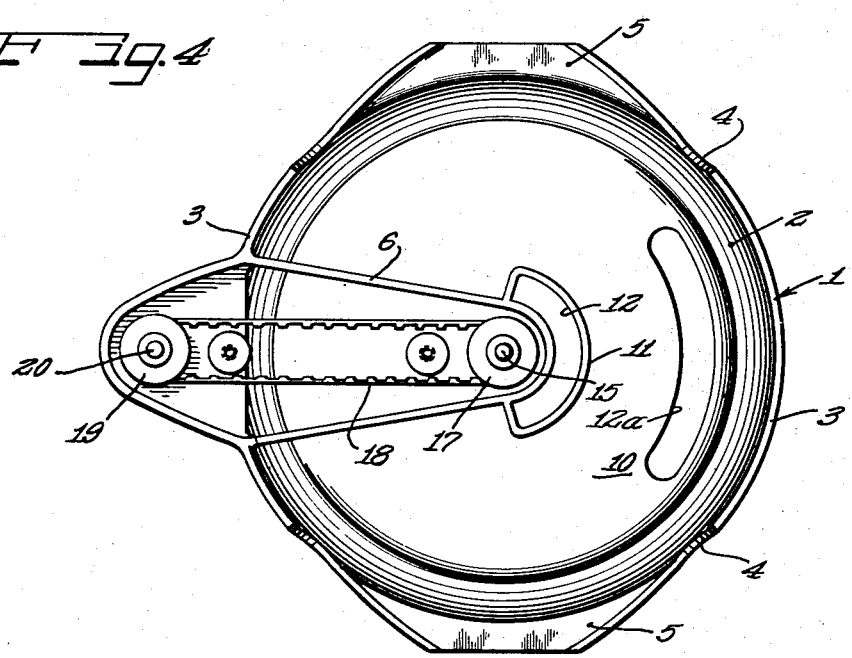
FIGURE 4 is a bottom plan view of the peeling device, with the base plate removed.

The container assembly also embodies an inner shell 9 having a curvate bottom 10 which is actually the container for the vegetables to be peeled. The bottom 10 merges with the aforesaid drive housing 6 as clearly seen in FIGURES 2 and 4, and is provided with a depending neck 11 spaced from the housing portion to define a drain opening 12 from the container 9. Preferably the inner and outer shells 2 and 9 are connected at the upper ends thereof as indicated at 13, this being particularly true when the shells are cast as a unit. Another drain opening 12a is provided adjacent the outer edge of the bottom 10 for the quick exit of swirling water to eliminate the likelihood of vegetables floating and not properly contacting the abrasive material by their natural weight.

It will be noted that while the outer shell 2 slopes outwardly and downwardly to better support the peeler, inner shell or container 9 between the juncture 13 and the bottom 10 is preferably cylindrical and of substantially uniform diameter throughout, there being no formations on this container wall to cause a bouncing or knocking about of vegetables being peeled. In the lower part of the container 9 a turntable 14 is removably seated on an upstanding shaft 15 in a manner to establish a driving connection therebetween. The shaft 15 is suitably journalled in a boss on the base plate 7 and through the bottom 10 of the vegetable container. The turntable 14 is spaced above the bottom 10 of the container 9 and is also of less diameter than the container wall, leaving a space therebetween as indicated at 16 in FIGURE 2 through which space water and peeled grindings may descend to the aforesaid outlets 12 and 12a.

The drive means for rotating the turntable 14 include a pinion 17 keyed to the aforesaid shaft 15 and connected by way of a rack belt 18 to a pinion 19 keyed to another upstanding drive shaft 20 located in that portion of the housing 6 outside of the container structure 1. On the upper end of this drive shaft 20 is a drive coupling 21 having a groove formation 22 in the general form of a Greek cross in the upper face thereof. This groove formation will readily receive therein the lower ends of the blades 23 on a beating attachment connected with the customary household mixing machine 24, as seen in FIGURE 1. As stated above, however, if the instant invention is made in a large size for commercial usage in a restaurant, vegetable processing plant or the like a standard electric motor may be utilized to drive the shaft 20 or be connected through suitable gearing directly to the shaft 15.

As seen in FIGURES 1 and 2, a suitable cover 25 provided with a handle 26 may be placed on the upper edge of the junction 13 between the outer shell 2 and the container 9 to enclose the vegetables during the peeling operation. The side wall of cover 25 has the same slope as the outer shell 2, so the cover may be placed on the container in inverted position for space saving storage when the device is not in use. This cover is also provided with a recess 27 in the top thereof which terminates in an inwardly extending nipple 28 so that water may enter the container during the peeling operation. As seen in FIGURES 1 and 2, the cover 25 is preferably made of transparent material such as glass, or a suitable transparent plastic material so that the contents of the container may be viewed during the peeling operation.

With reference now to FIGURES 2 and 3, it will be noted that the inner face of the container 9 is provided with a circumferential abrasive band 29, which may satisfactorily be a sheet of water impervious paper or other suitable backing material that is unaffected by water, carrying water resistive pressure sensitive adhesive on its outer face to secure it to the container wall, and a suitable abrasive such as silicon carbide particles on its inner face to act upon the vegetables. Such an abrasive band may be stripped out of the container and replaced with a new band when necessary. An abrasive disc 30, of similar construction, is attached to the upper face of the turntable 14 and, of course, is likewise removable and replaceable with a new disc whenever necessary.

It is to be particularly noted that the abrasive disc 30 is of less diameter than the turntable, and preferably has a diameter at least 1½ inches less than the inside diameter of the container 9, thereby providing a space having a minimum width of ¾ inch between the circumference of the disc 30 and the container wall. The width of that space may exceed ¾ inch to a reasonable extent without interfering with adequate and satisfactory operation of the peeler, but preferably it should not be less than that width. The provision of such a space insures even and smooth rolling of a vegetable on the abrasive surface of the disc 30 and against the abrasive band or liner 29 on the container wall. It has been found that a smaller space frequently resulted in what might be termed a dragging of a vegetable against the wall band 29, without any rotation, and thus an objectionable grinding away of the vegetable on one side only without effectively peeling the entire vegetable. Provision of an adequate space between the abrasive disc and container wall thus eliminates improper peeling, misshaping, and the objectionable loss of a material quantity of the vegetable.

In use, the instant invention is not only rapid, but extremely effective. It is a simple expedient to remove the cover 25, place a number of vegetables to be peeled on the turntable 14 inside the container 9, replace the cover, and position the peeler so that water from any suitable source may enter the container through the recess 27 and nipple 28, and exit from the container to any suitable drain through the outlets 12 and 12a. The water and peel grindings will pass through the space 16 between the turntable and container wall to the outlets 12 and 12a and the action of the water will maintain the bottom 10 of the container as well as the abrasive on the turntable substantially clean.

During the peeling operation, the vegetables are evenly and smoothly rolled around the inside of the container wall and acted upon by the abrasive on the turntable and the wall band 29, resulting in even and clean peeling of the vegetables. The flatness of the turntable 14 and the uniformity of diameter of the container wall eliminates any bouncing, knocking about, bruising, chipping, misshaping, or other action injurious to the vegetables. Likewise, the vegetables cannot jam or wedge since the container is entirely empty above the platform 14 save for the vegetables themselves and the water passing through. With reasonable care upon the part of the operator, all danger of over peeling and loss of a usable part of the vegetable is eliminated. As stated above, the space between the circumference of the disc 30 and the container wall insures proper movement of the vegetables during the peeling operation.

It will be understood that modifications and variations may be effected without departing from the scope of the novel concepts of the present invention.

I claim as my invention:

1. In a vegetable peeler,
   a container having an opening at the top and an outlet opening at the bottom,
   a flat-top turntable in the lower part of said container and of less diameter than the inside diameter of the container to leave a flow passage therebetween,
   drive means to rotate said turntable connected to the underside thereof,
   an abrasive band around the inside of said container in the region vegetables are located for peeling, and
   an abrasive disc on the upper face of said turntable and of less diameter than the turntable.

2. The vegetable peeler of claim 1, including
   a transparent cover having an inlet port seatable on said container.

3. The vegetable peeler of claim 1, wherein
   the wall of said container above said turntable is of substantially uniform diameter.

4. The vegetable peeler of claim 1, wherein
   the annular space between said abrasive disc on the turntable and the container wall is sufficient to insure even and smooth rolling of the vegetables against the abrasive band and disc.

5. The vegetable peeler of claim 4, wherein
   said annular space is at least three-fourths of an inch in width.

6. The vegetable peeler of claim 3, wherein
   the space above said turntable is unobstructed, and
   the annular space between said abrasive disc and the container wall is at least three-fourths inch in width.

7. The vegetable peeler of claim 6, including
   a transparent cover having an inlet opening in the top thereof and seatable on the top of said container.

8. The vegetable peeler of claim 1, wherein said drive means include
   an upstanding shaft on which said turntable is removably seated,
   a drive shaft situated in a position for ready connection to a power source,
   a pinion on each of said shafts, and
   a rack belt interconnecting said pinions.

9. The vegetable peeler of claim 1, including
   a supporting shell around said container and having a base formation upon which the peeler rests.

10. The vegetable peeler of claim 9, wherein
    said drive means are enclosed in a housing in the base portion of said supporting shell.

References Cited

UNITED STATES PATENTS

| | | | |
|---|---|---|---|
| 999,478 | 8/1911 | Archer | 146—49 |
| 1,945,978 | 2/1934 | Palombo et al. | 146—49 |
| 3,059,679 | 10/1962 | Resk | 146—49 |

JAMES M. MEISTER, *Primary Examiner.*